United States Patent Office 2,876,247
Patented Mar. 3, 1959

2,876,247

POLYMERIC POLYFLUOROALKYL PHOSPHONITRILATES

Rudi F. W. Rätz and Christoph J. Grundmann, Columbus, Ohio, assignors to Olin Mathieson Chemical Corporation, a corporation of Virginia No Drawing. Application July 3, 1957
Serial No. 669,700

13 Claims. (Cl. 260—461)

This invention relates to polymeric polyfluoroalkyl phosphonitrilates and their preparation.

Esters of the cyclic phosphonitrilic acids,

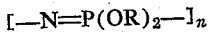

have never been isolated (analyzed) despite the fact that the reactions of the phosphonitrilic chlorides $(PNCl_2)_n$ with various alcohols have been the subject of considerable study. The reason for this appears to be partly the thermal instability of the phosphonitrilates and partly their tendency for polymerization. For example, the reaction product of trimeric phosphonitrilic chloride and sodium ethylate is a viscous oil which forms a high polymeric product on standing at room temperature. On moderate heating, however, the ethylphosphonitrilate splits off diethylether with formation of a resinous material.

It has now been found, however, that surprisingly the alkali metal salts of polyfluoro carbinols react with the various phosphonitrilic halides to provide thermoresistant condensation products which are easily identified by analysis of the distilled product as polyfluoroalkyl esters of phosphonitrilic acids.

The polymeric phosphorus nitrilic halides (or phosphonitrile halides) suitable for the reaction have the formula $$(X_2P\equiv N)_n \qquad (I)$$

wherein X is chlorine, bromine or fluorine but preferably chlorine or bromine and $n$ is a whole number, e. g. a small whole number of at least 3 and up to 7 or higher. For example, $(Cl_2PN)_n$ and $(Br_2PN)_n$ are useful. The trimeric and tetrameric halides are particularly useful.

The alkali metal salts of the polyfluoro carbinols have the formula $$Y\cdot(CF_2)_m\cdot CH_2OM \qquad (II)$$

wherein Y is H or F, $m$ is a whole number, e. g. 1 to 20, and M is an alkali metal, e. g. sodium, lithium or potassium.

The reaction proceeds as follows:

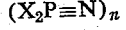
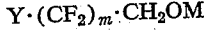
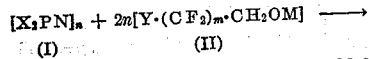
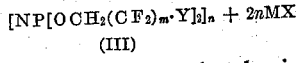

Thus, the new polymeric polyfluoroalkyl phosphonitrilates have the Formula III above wherein $m$ and Y have the same meanings as in Formula II and $n$ has the same meaning as in Formula I, i. e. a whole number, e. g. a small whole number of at least 3 and up to 7 or higher.

The trimeric bis-polyfluoroalkyl phosphonitrilates have the formula:

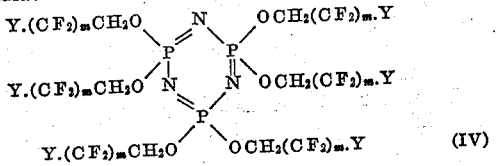

The tetrameric bis-polyfluoroalkyl phosphonitrilates have the formula:

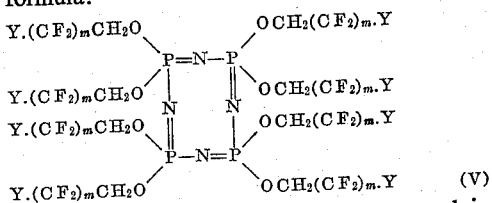

The polyfluoroalkyl phosphonitrilates are prepared in very good yields by admixing the phosphonitrilic chlorides with the alkali metal polyfluoro alcoholate. The reaction is preferably carried out with a diluent or solvent for the alkali metal alcoholate, for example an excess of the employed polyfluoro alcohol, or an inert solvent like benzene, toluene, xylene or ligroine and dioxane. The alkali metal sodium is preferred but the reaction can be carried out as well with lithium or potassium. The reaction proceeds in general at temperatures between 80° C. and 150° C. The alkali metal halide formed in the reaction is generally insoluble in the applied solvent. The end of the reaction can be determined by the point where no more alkali metal halide is formed. The salt can be removed by filtration or by washing with water. The remaining product is then separated by distillation.

In the reaction, as noted in the equation described above, the stoichiometric proportions of the reactants are dependent on the number of units in the polymeric phosphorus nitrilic halide, i. e. the moles of the metal alcoholate used equals the number of moles of the polymeric nitrilic halide used multiplied by twice the number of units in the polymeric nitrilic halide. For example, the stoichometric ratio when a trimeric nitrilic halide is used is one mole of the trimer to six moles of the metal alcoholate.

The new polyfluoroalkyl phosphonitrilates are low melting or liquid, almost odorless and colorless compounds. In general they are insoluble in water, but miscible or of very good solubility in most common organic solvents. They are not inflammable. They have a remarkable thermal stability and can be distilled under atmospheric pressure without decomposition. By proper choice of the polymeric phosphonitrilic halide and the fluorinated alcohol products with boiling points ranging from 250° C. to 500° C. and more can be obtained. The new polyfluoroalkyl phosphonitrilates are also unusually chemical resistant, especially against oxidation, even to the extent that the commonly adopted methods of organic elementary analysis by combustion over cupric oxide in a stream of oxygen do not completely destroy these new compounds. Contrary to ordinary esters, the new compounds are extremely difficult to hydrolyze. Refluxing with concentrated nitric acid or concentrated aqueous alkali hydroxides does not attack these products to any measurable amount. They even can be distilled at atmospheric pressure over sodium metal without decomposition. These remarkable properties make these new polyfluoroalkyl phosphonitrilates valuable for many industrial applications. They can be used as heat transfer media, high temperature lubricants, transformer oils, fire-retardant plasticizers and hydraulic fluids.

The new compounds will be further described in the following examples.

EXAMPLE I

*Trimeric bis-1,1,H,H-pentafluoropropyl-phosphonitrilate (m=2, Y=F)*

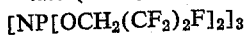

Metallic sodium (3.45 grams), cut into small pieces, was added to 45.0 grams of pentafluoropropanol. To achieve complete solution, the mixture was finally heated on a steam bath. The excess of pentafluoropropanol was removed by distillation under atmospheric pressure, finally at a vacuum of 20 mm. The remaining alcoholate was mixed with 200 milliliters of dry toluene and a solution of 8 grams of $(PNCl_2)_3$ in 30 milliliters of toluene added dropwise with stirring within 20 minutes. After two hours refluxing and standing overnight, the formed sodium chloride was removed by filtration. The solvent was then distilled off, whereby 20.7 grams of an oily residue was obtained which distilled without decomposition under atmospheric pressure. For purification the product was distilled again in vacuo, B. P./6 mm.: 136.5° C., $n_D^{28}$ 1.3365. Melting point 16°–18° C., yield: 86.4%. The compound is a colorless oil, soluble in ether, ethanol, aromatic hydrocarbons and insoluble in water.

Calcd. for $(C_6H_4F_{10}NO_2P)_3$: C, 21.00; H, 1.17; F, 55.39; N, 4.08; P, 9.03. Found: C, 20.99, 20.93; H, 1.59, 1.50; F, 54.23, 54.07; N, 5.25, 5.32; P, 9.10, 9.41.

The ebullioscopic molecular weight determination in benzene gave the value 835, calcd. for $(C_6H_4F_{10}NO_2P)_3$ 1029. If this compound is heated to 210° C. and a rapid stream of dry air is passed through for two hours, the refraction index remains absolutely constant and the product is still colorless.

EXAMPLE II

*Trimeric bis-1,1,H,H-heptafluorobutyl-phosphonitrilate (m=3, Y=F)*

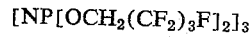

$[NP[OCH_2(CF_2)_3F]_2]_3$

This compound was obtained quite analogous to the preceding description from 92 grams of heptafluorobutanol, 5.3 grams of sodium, and 12.6 grams of $(PNCl_2)_3$. Colorless oil; B. P./3 mm.: 154° C., $n_D^{25°}$: 1.3309; yield: 84 percent.

Calcd. for $C_{24}H_{12}F_{42}N_3O_6P_3$: C, 21.68; H, 0.91; N, 3.16; P, 6.99. Found: C, 20.94, 21.10; H, 1.22, 1.39; N, 3.27, 318; P, 6.79, 6.65.

EXAMPLE III

*Tetrameric bis-1,1,H,H-pentafluoropropyl-phosphonitrilate (m=2, Y=F)*

$[NP[OCH_2(CF_2)_2F]_2]_4$

This compound was also obtained according to the procedure described above from 21.5 grams pentafluoropropanol, 1.5 grams of sodium and 4.2 grams of $(PNCl_2)_4$. Colorless oil; B. P./3 mm.: 142°–144° C., $n_D^{27°}$: 1.3530.; yield: 89 percent.

Calcd. for $C_{24}H_{16}F_{40}N_4O_8P_4$: C, 21.00; H, 1.17; F, 55.39; N, 4.08; P, 9.03. Found: C, 20.97, 20.95; H, 1.31, 1.50; F, 55.37, 55.10; N, 4.06, 4.14; P, 9.07, 8.81.

Mol. weight: calcd. 1372; found: (ebullioscopic) 1190; 1180.

EXAMPLE IV

*Trimeric bis-1,1-H-trifluoroethyl-phosphonitrilate (m=1, Y=F)*

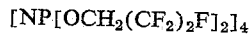

$[NP[OCH_2(CF_2)F]_2]_3$

Metallic sodium (2.76 grams) was dissolved in 30 grams of 2,2,2-trifluoroethanol. The excess of alcohol was removed by distillation in a 40 mm. vacuum and the remaining sodium-trifluoroethoxide suspended in 100 milliliters of dry toluene. Within 20 minutes a solution of 6.3 grams of trimeric phosphonitrilic chloride in 40 milliliters of toluene was added with stirring. After refluxing the mixture for five hours, the reaction product was worked up in the usual manner, yielding a colorless oil (10.4 grams—99.5 percent), which solidified on standing. Boiling point 248° C./743 mm.; 115°–116° C./3 mm.; melting point 38° C., after recrystallization from Skellysolve B.

Calcd. for $C_{12}H_{12}F_{18}N_3O_6P_3$: C, 19.76; H, 1.66; F, 46.90; N, 5.76; P, 12.75. Found: C, 19.79; H, 2.00; F, 46.06; N, 5.64; P, 12.72.

EXAMPLE V

*Tetrameric bis-1,1-H-heptafluorobutyl-phosphonitrilate (m=1, Y=F)*

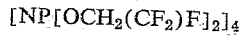

$[NP[OCH_2(CF_2)F]_2]_4$

Metallic sodium (2.46 grams) was dissolved in 30 grams of 2,2,2-trifluoroethanol and the formed sodium trifluoroethoxide was reacted with 5.5 grams of tetrameric phosphonitrilic chloride as described above. Yield: 10.2 grams (88.7 percent) of a crystalline material, boiling point 139°–140° C./3 mm.; melting point 65° C., after recrystallization from Skellysolve B.

Calcd. for $C_{16}H_{16}F_{24}N_4O_8P_4$: C, 19.76; H, 1.66; F, 46.90; N, 5.76; P, 12.75. Found: C, 19.82; H, 2.13; F, 45.79; N, 5.79; P, 12.75.

EXAMPLE VI

*Tetrameric bis-1,1-H-hephafluorobutyl-phosphonitrilate (m=3, Y=F)*

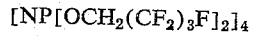

$[NP[OCH_2(CF_2)_3F]_2]_4$

Metallic sodium (6.6 grams) was dissolved in 100 grams of heptafluorobutanol and the unreacted fluoroalcohol recovered by distillation in a moderate vacuum. After suspension in 350 milliliters of dry toluene, the sodium heptafluorobutoxide was reacted with stirring with a solution of 13.0 grams of tetrameric phosphonitrilic chloride in 80 milliliters of dry toluene. After six hours refluxing, the mixture was cooled off, whereupon most of the reaction product separated as a heavy oil. The oily sodium chloride-containing layer was extracted with ether and, after filtering, the ether removed by distillation. The remaining residue was combined with a small amount of the same product, obtained by distilling off the toluene. Boiling point 305° C./743 mm.; 169.5°–171.5° C./3 mm.; melting point 84°–85° C. after recrystallization from Skellysolve C. Colorless waxy material. Yield: 40 grams—81 percent.

Calcd. for $C_{32}H_{16}F_{56}N_4O_8P_4$: C, 21.68; H, 0.91; N, 3.16; P, 6.99; F, 60.03. Found: C, 22.00, 21.88; H, 0.79, 0.93; N, 3.21, 3.35; P, 7.23, 7.12; F, 59.86, 59.99.

After refluxing this compound for one hour with 68 percent nitric acid, the product is recovered quantitatively, colorless and unchanged in melting point. Even with the very sensitive ammonium molybdate reagent no trace of phosphate ion can be detected in the acid mother liquor. Refluxing with 30 percent aqueous sodium hydroxide is likewise without any detectable effect on this compound. The melting point remains unchanged and the substance is not discolored.

EXAMPLE VII

*Trimeric-bis-1,1,7-H-dodeca-fluoroheptyl-phosphonitrilate (m=6, Y=H)*

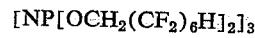

$[NP[OCH_2(CF_2)_6H]_2]_3$ 1,1,7-trihydroperfluoroheptanol (9.96 grams=0.03 mole) was dissolved in 20 milliliters of dry toluene and 0.72 gram of sodium hydride added. After three hours refluxing, the sodium hydride was dissolved. After cooling off to room temperature, 30 milliliters more of toluene was added. A solution of 1.74 grams of trimeric phosphonitrilic chloride (0.005 mole) in 10 milliliters of toluene was added dropwise with stirring over a period of 10 minutes at 50° C. The reaction was completed by seven hours refluxing. The formed sodium chloride was filtered off and the solvent removed by distillation. The amount of the remaining crude material was 10.55 grams=99.2%. Boiling point $_{2\ mm.}$: 258–260° C. The product crystallized as a waxy colorless material, melting point 32–36° C. from carbon tetrachloride.

Calcd. for $C_{42}H_{18}F_{72}N_3P_3O_6$: P, 4.33. Found: P, 4.47, 4.51.

EXAMPLE VIII

*Tetrameric bis-1,1,7-H-dodecafluoroheptyl-phosphonitrilate (m=6, Y=H)*

$$[NP[OCH_2(CF_2)_6H]_2]_4$$

This compound was obtained quite analogous to the preceding description from 13.28 grams of 1,1,7-trihydro-perfluoroheptanol, 0.96 gram of sodium hydride and 2.32 grams of $[PNCl_2]_4$ as a heavy, slightly-yellowish oil, boiling point $_{1\ mm.}$: 265° C., $b$ $_{750\ mm.}$: 398–401° C. Yield: 14.00 grams=93%.

EXAMPLE IX

*Trimeric bis-1,1,11-H-eicosa-fluoro-undecanyl-phosphonitrilate (m=10, Y=H)*

$$[NP[OCH_2(CF_2)_{10}H]_2]_3$$

1,1,11-trihydroperfluoroundecanol (15.96 grams=0.03 mole) was dissolved in 30 milliliters of absolute ether and 0.72 gram of sodium hydride added. After three hours refluxing formation of the sodium salt was completed. The ether was distilled off in a moderate vacuum and the remaining colorless powder was suspended in 50 milliliters of dry tetraline. A solution of 1.74 grams of $[PNCl_2]_3$ (0.005 mole) in 30 milliliters of tetraline was then dropwise added with stirring at 70° C. The mixture was finally held for six hours at 175° C. while stirring was continued. After cooling off, the tetraline insoluble reaction product, mixed with sodium chloride, was collected on a Büchner-funnel. This material was extracted with two portions of 50 milliliters of water of 70° C. in order to remove sodium chloride. The crude phosphonitrilate then was dried over $P_4O_{10}$ for 24 hours and finally vacuum-distilled from a metal bath. At first at 160° C./2 mm. a small amount of unreacted 1,1,11-trihydro-perfluoroundecanol distilled over, then the phosphonitrilate at 320° C.–324° C./2 mm. Yield: 80%. The product melts at 103–105° C. after recrystallization from toluene. The compound is soluble in ether and acetone.

EXAMPLE X

*Tetrameric bis-1,1-11-H-eicosafluoroundecanyl-phosphonitrilate (m=10, Y=H)*

$$[NP[OCH_2(CF_2)_{10}H]_2]_4$$

This compound was obtained in a similar manner as described in Example IX, using toluene instead of tetraline as a solvent. From 21.28 grams of 1,1,11-H-eicosa-fluoroundecanol (0.04 mole), 0.96 gram of sodium-hydride and 2.32 grams of tetrameric phosphonitrilic chloride (0.005 mole) a crystalline colorless material (20 grams=90%) was obtained. Boiling point $_{0.1\ mm.}$: 312–320° C. It melts at 102–105° C. after recrystallization from toluene.

What is claimed is:

1. Polymeric polyfluoroalkyl phosphonitrilates of the formula $$[NP[OCH_2(CF_2)_m \cdot Y]_2]_n$$

wherein Y is selected from the group consisting of hydrogen and fluorine, $m$ is a whole number from 1 to 20 and $n$ is a whole number from 3 to 7.

2. Trimeric bis-1,1,H,H-pentafluoropropyl-phosphonitrilate.

3. Trimeric bis-1,1,H,H-heptafluorobutyl-phosphonitrilate.

4. Tetrameric bis-1,1,H,H-pentafluoropropyl-phosphonitrilate.

5. Trimeric bis-1,1,7-H-dodeca-fluoroheptyl-phosphonitrilate.

6. Tetrameric bis-1,1,7-H-dodeca-fluoroheptyl-phosphonitrilate.

7. The method of producing polymeric polyfluoroalkyl phosphonitrilates which comprises admixing a polymeric phosphorus nitrilic halide of the formula $(X_2P\equiv N)_n$ wherein $n$ is a whole number of from 3 to 7 and X is selected from the group consisting of chlorine, bromine and fluorine, with an alkali metal salt of a polyfluoro carbinol of the formula $$Y \cdot (CF_2)_m \cdot CH_2OM$$

wherein Y is selected from the group consisting of hydrogen and fluorine, $m$ is an integer of from 1 to 20 and M is an alkali metal, at a temperature and for a time and in proportions effective to produce the polymeric polyfluoroalkyl phosphonitrilates.

8. The method of claim 7 in which the temperature varies from about 80° C. to about 150° C.

9. The method of claim 8 in which the phosphorus nitrilic halide is trimeric phosphorus nitrilic chloride and the carbinol salt is the sodium salt of pentafluoropropanol.

10. The method of claim 8 in which the phosphorus nitrilic halide is trimeric phosphorus nitrilic chloride and the carbinol salt is the sodium salt of heptafluorobutanol.

11. The method of claim 8 in which the phosphorus nitrilic halide is tetrameric phosphorus nitrilic chloride and the carbinol salt is the sodium salt of pentafluoropropanol.

12. The method of claim 8 in which the phosphorus nitrilic halide is trimeric phosphorus nitrilic chloride and the carbinol salt is the sodium salt of 1,1,7-trihydroperfluoroheptanol.

13. The method of claim 8 in which the phosphorus nitrilic halide is tetrameric phosphorus nitrilic chloride and the carbinol salt is the sodium salt of 1,1,7-trihydroperfluoroheptanol.

References Cited in the file of this patent

Hamalainen et al.: Textile Research Journal 26, No. 2, February 1956, pp. 141–144.